United States Patent
Ahmed (10) Patent No.: US 12,275,651 B1
(45) Date of Patent: Apr. 15, 2025

(54) METHOD OF FORMING ZINC OXIDE/BORATE NANOCOMPOSITE

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

(*) Notice: Subject to any disclaimer, the term of this patent is extended or adjusted under 35 U.S.C. 154(b) by 0 days.

(21) Appl. No.: 18/936,390

(22) Filed: Nov. 4, 2024

(51) Int. Cl.
C01G 9/02 (2006.01)
B82Y 30/00 (2011.01)

(52) U.S. Cl.
CPC ............... C01G 9/02 (2013.01); B82Y 30/00 (2013.01); C01P 2002/60 (2013.01); C01P 2006/12 (2013.01); C01P 2006/14 (2013.01); C01P 2006/16 (2013.01)

(58) Field of Classification Search
None
See application file for complete search history.

(56) References Cited

U.S. PATENT DOCUMENTS 6,200,680 B1 * 3/2001 Takeda ................. C09C 1/0081
502/343

FOREIGN PATENT DOCUMENTS

| CN | 103922391 A | 7/2014 |
|---|---|---|
| CN | 104017190 A | 9/2014 |
| CN | 117105206 A | 11/2023 |
| CN | 118343996 A | 7/2024 |

OTHER PUBLICATIONS

Umut Yerlesen, et al., "Effect of zinc oxide and zinc borate on mechanical properties of high density polyethylene", Revista Romana De Materiale-Romanian Journal of Materials, vol. 45, Issue 4, 2015 (1 page).

Irina V. Kozerozhets, et al., "A new approach for the synthesis of powder zinc oxide and zinc borates with desired properties", Inorganics, vol. 10, Issue 11, Nov. 17, 2022 (13 pages).

* cited by examiner

Primary Examiner — Guinever S Gregorio
(74) Attorney, Agent, or Firm — Oblon, McClelland, Maier & Neustadt, L.L.P.

(57) ABSTRACT

A method of forming a zinc oxide/borate nanocomposite that includes mixing a borate solution including boric acid in a polar solvent, and a zinc solution including a zinc carboxylate complex including a zinc ion and a coordinated carboxylate ligand to form a precursor mixture. Further, a polyol is added to the precursor mixture to form a reaction mixture, followed by heating the reaction mixture to 100 to 150° C. to form a solid intermediate product and calcination the solid intermediate product at 500 to 800° C. to form the zinc oxide/borate nanocomposite. The nanocomposite includes $Zn_3(BO_3)_2$ and ZnO.

20 Claims, 7 Drawing Sheets

1: Dissociation of zinc(II) nitrate hexahydrate $Zn(NO_3)_2 \cdot 6H_2O \longrightarrow Zn^{2+} + 2NO_3^- + 6H_2O$ 2: Reaction of boric acid in water $H_3BO_3 + H_2O \longrightarrow B(OH)_4^- + H^+$ 3: Formation of metal citrate complex $Zn^{2+} + B(OH)_4^- + \text{Citric acid } (C_6H_8O_7) \longrightarrow [ZnB(Citrate)] + H_2O$ 4: Polyesterification reaction Ethylene glycol + [ZnB(Citrate)] $\longrightarrow$ Polymeric network 5: Formation of ZnO/Zn$_3$(BO$_3$)$_2$ nanocomposite by calcination at 650 °C Polymeric network $\xrightarrow{650\ °C}$ ZnO/Zn$_3$(BO$_3$)$_2$ nanocomposite

METHOD OF FORMING ZINC OXIDE/BORATE NANOCOMPOSITE

BACKGROUND

Technical Field

The present disclosure is directed to a method of producing a zinc oxide/borate-based nanocomposite.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Nanocomposites have at least one phase having a dimensions in the nanometer range. The properties of nanocomposites are greatly affected by the composition, interfacial interactions, and configuration of the individual components. Nanocomposites are used in various fields including, but not limited to, environmental remediation, sensor technology, as photocatalyst, energy storage devices, food technology, and packaging.

A primary application of nanomaterials in environmental decontamination/remediation involves using nanomaterials as adsorbent materials (sometimes referred to as "nano sorbents" or other similar term) to remove or adsorb the pollutants from contaminated water or air. Separately, heterogeneous photocatalysts have been widely studied for environmental remediation. Various semiconductor materials-based photocatalysts, e.g., $TiO_2$, $SnO_2$, $Bi_2O_3$, CdS, CdSe, $WO_3$, and ZnO, have been investigated to remove organic pollutants from contaminated water by chemical reactions to degrade the pollutants. Conventional heterogenous catalysts, however, suffer from certain drawbacks that makes their widespread use disadvantageous. For example, ZnO photocatalysts have a wide energy band gap and only adsorb UV light, which limits photocatalytic activity to the UV region. Further, photo instability in aqueous solutions due to photo-corrosion caused by UV light irradiation leads to a decrease in photocatalyst activity.

Further, materials like ZnO also have promising applications in electronic applications such as fabricating sensors or energy storage materials. With the ever-increasing need to improve the performance and operation life of mobile devices, developing higher power density energy storage devices has been receiving more attention. Lithium-ion batteries (LIB) and capacitors are two of the most widely used energy storage devices and have attracted increasing interest from both industrial and academic fields. Batteries have higher power density than capacitors but significantly longer charge/discharge rates. To further improve the performance of the energy storage devices, one of the approaches is to use a high specific surface area nanomaterial.

However, there are challenges associated with the preparation of nanomaterials like ZnO. High-quality and stable p-type ZnO materials are notoriously difficult to synthesize, which restricts the development of ZnO-based materials. Also, precisely controlling the morphology of ZnO nanostructures is another challenge. Since the properties of a nanomaterial depend on the exact structure and morphology, achieving the exact properties desired for nanosensor applications requires very precise control over the structure, size, and shape of ZnO and other nanomaterials. Moreover, there are challenges in integrating multiple distinct nanomaterials into a single composite, which is essential for developing electronic devices. Many studies have been performed on single-material ZnO sensors, but comparatively little work has bene done to prepare and investigate composite materials including ZnO.

Zinc borates have found uses in sensors of optoelectronic devices because of its specific properties, such as flame retardancy, corrosion inhibitors, smoke suppressants, synergistic effect, antibacterial property, good mechanical properties, and high surface area. However, the method of producing zinc borate has some disadvantages, such as long reaction time, multiple steps, and impurities remaining in the product due to the surfactant. These disadvantages will significantly influence the production cost of the zinc borate.

Accordingly, one object of the present disclosure is to develop a nanocomposite having a combination of zinc oxide and zinc orthoborate phases within a single composite material, which is tailored to improve properties like enhanced mesoporosity, high surface area, and improved structural stability.

SUMMARY

According to a first aspect, the present disclosure relates to a method of forming a zinc oxide/borate nanocomposite. In some embodiments, the method includes mixing a borate solution, including boric acid, in a polar solvent, and a zinc solution, including a zinc carboxylate complex, including a zinc ion and a coordinated carboxylate ligand, to form a precursor mixture. In some embodiments, the method further includes adding to the precursor mixture a polyol to form a reaction mixture, heating the reaction mixture to 100 to 150° C. to form a solid intermediate product, and calcining the solid intermediate product at 500 to 800° C. to form the zinc oxide/borate nanocomposite. In some embodiments, the zinc oxide/borate nanocomposite includes $Zn_3(BO_3)_2$ and ZnO, and the zinc oxide/borate nanocomposite has a Brunauer-Emmett-Teller (BET) surface area of 15 to 60 $m^2$/g, a pore volume of 0.100 to 0.200 $cm^3$/g, and a mean pore diameter of 5 to 10 nm. In some embodiments, the zinc oxide/borate nanocomposite has a mean crystallite size of 10 to 150 nanometer (nm) by powder X-ray diffraction (PXRD). In some embodiments, the zinc oxide/borate nanocomposite includes agglomerates of crystallites, and the agglomerates have a mean particle size of 100 to 750 nm.

In some embodiments, the borate solution has a concentration of boric acid of 0.25 to 0.75 M.

In some embodiments, the precursor mixture has a ratio of zinc to borate of 0.75:1 to 1:0.75.

In some embodiments, the reaction mixture has a ratio of carboxylate ligand to polyol of 0.1:1 to 1:1.

In some embodiments, the coordinate carboxylate ligand is a polydentate carboxylate ligand.

In some embodiments, the polydentate carboxylate ligand includes 3 to 6 carboxylate functional groups.

In some embodiments, the zinc carboxylate complex is a zinc citrate complex.

In some embodiments, the polar solvent is at least one selected from the group consisting of tetrahydrofuran, ethyl acetate, acetone, dimethylformamide, acetonitrile, dimethyl sulfoxide, formic acid, acetic acid, methanol, ethanol, n-propanol, isopropanol, nitromethane, and water.

In some embodiments, the polar solvent is water.

In some embodiments, the polyol is at least one selected from the group consisting of a diol, a triol, a tetrol, and a pentol.

In some embodiments, the polyol is a diol.

In some embodiments, the polyol is a ethylene glycol.

In some embodiments, the method includes forming the zinc carboxylate complex by mixing a zinc precursor solution including a zinc salt and water, and a carboxylate solution including the carboxylate ligand or an acid form thereof.

In some embodiments, the zinc salt is zinc nitrate.

In some embodiments, the carboxylate ligand or an acid form thereof is citric acid.

In some embodiments, the zinc oxide/borate nanocomposite is substantially free of boron hydroxide by PXRD.

The present disclosure also relates to a nanocomposite that includes $Zn_3(BO_3)_2$ and ZnO. In some embodiments, the nanocomposite has a Brunauer-Emmett-Teller (BET) surface area of 15 to 60 $m^2/g$, a pore volume of 0.100 to 0.200 $cm^3/g$, and a mean pore diameter of 5 to 10 nm. In some embodiments, the nanocomposite has a mean crystallite size of 10 to 150 nm by PXRD. In some embodiments, the nanocomposite further includes agglomerates of crystallites, and the agglomerates have a mean particle size of 100 to 750 nm.

In some embodiments, the $Zn_3(BO_3)_2$ is crystalline monoclinic $Zn_3(BO_3)_2$ by PXRD.

In some embodiments, the ZnO is crystalline hexagonal ZnO by PXRD.

In some embodiments, the nanocomposite is substantially free of boron hydroxide by PXRD.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Embodiments of the present disclosure will now be described more fully hereinafter with reference to the accompanying drawings, in which some, but not all embodiments of the disclosure are shown.

As used herein, the words "about," "approximately," or "substantially similar" may be used when describing magnitude and or position to indicate that the value and/or position described is within a reasonable expected range of values and/or positions. For example, a numeric value may have a value that is +/−0.1% of the stated value (or range of values), +/−1% of the slated value (or range of values), +/−2% of the stated value (or range of values), +/−5% of the slated value (or range of values), +/−10% of the staled value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the term 'nanocomposite or nanoparticles' refers to materials that are engineered at the nanoscale, typically defined as having one or more dimensions in the range of 1 to 1000 nanometers.

As used herein, the term 'mesoporous' refers to materials characterized by pore sizes typically ranging from 2 to 50 nanometers in diameter.

As used herein, 'particle size' and 'pore size' may be considered the lengths or longest dimensions of a particle and a pore opening, respectively.

As used herein, the term 'aggregates' refers to the clumping of individual particles into larger aggregates or clusters, a process that significantly influences their physical and chemical properties. This phenomenon may be driven by several factors, including high surface energy, van der Waals forces, and electrostatic interactions, as well as the properties of the surrounding solvent, such as pH and ionic strength.

According to a first aspect, the present disclosure is related to a method of synthesis of ZnO/$Zn_3(BO_3)_2$ nanocomposite (also referred to as "a nanocomposite" or "the nanocomposite" herein for convenience. In some embodiments, the method involves a Pechini sol-gel synthetic scheme. In some embodiments, the combination of ZnO and $Zn_3(BO_3)$, phases within a single composite material is associated with a unique material composition and enhanced characteristics—such as enhanced microporosity, high surface area, and improved structural stability. The nanocomposite may be particularly suited for applications such as adsorption processes and catalytic reactions.

Figure 1A:
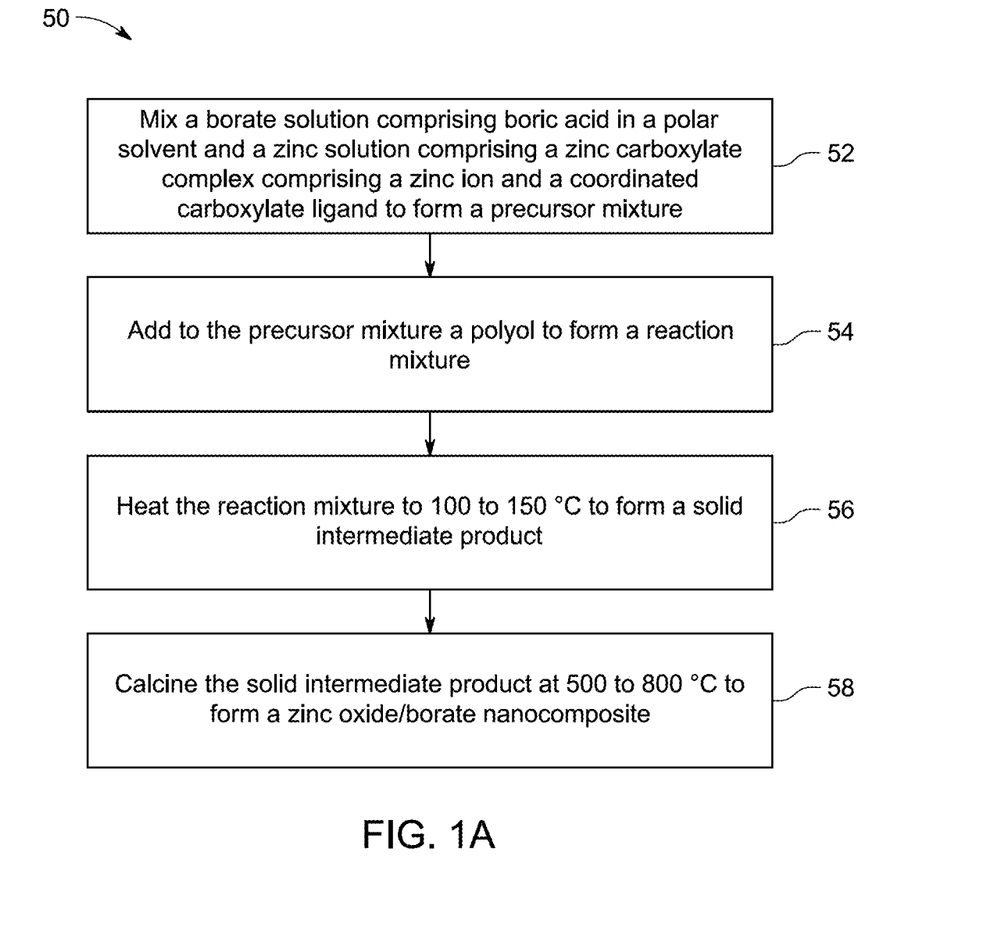
FIG. 1A is a schematic flow chart of a method of forming a zinc oxide/zinc orthoborate (ZnO/$Zn_3(BO_3)_2$) nanocomposite, according to certain embodiments.

FIG. 1A illustrates a schematic flow chart of an exemplary method 50 of synthesizing a zinc oxide/borate nanocomposite using a Pechini sol-gel method according to certain aspects of the present disclosure. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes mixing a borate solution comprising boric acid in a polar solvent and a zinc solution comprising a zinc carboxylate complex comprising a zinc ion and a coordinated carboxylate ligand to form a precursor mixture.

In some embodiments, the borate solution includes boric acid dissolved in a polar solvent. In some embodiments, the concentration of boric acid in the polar solvent ranges from 0.1 to 1.5 M, preferably to 0.15 to 1.25 M, preferably 0.20 to 1.00 M, preferably 0.25 to 0.75 M, preferably 0.30 to 0.70 M, preferably 0.35 to 0.60 M, preferably 0.40 to 0.55 M, preferably 0.45 to 0.50 M. In some embodiments, the polar solvent is at least one selected from the group consisting of tetrahydrofuran, ethyl acetate, acetone, dimethylformamide, acetonitrile, dimethyl sulfoxide, formic acid, acetic acid, methanol, ethanol, n-propanol, isopropanol, nitromethane, and water. In a preferred embodiment, the polar solvent is water. In general, the water can be any suitable water, preferably a purified water. The purified water can be purified by a suitable technique and can be described based on the purification technique. Examples of purified water include but not are not limited to distilled water, deionized water, reverse osmosis water, ultrafiltration water, and the like.

In some embodiments, the zinc carboxylate complex is obtained by mixing a zinc precursor solution, including a zinc salt and water, and a carboxylate solution, including the carboxylate ligand or an acid form thereof. In some embodiments, the zinc salt may be an organic zinc salt, such as zinc acetate, zinc propionate, zinc butyrate, zinc formate, zinc gluconate, zinc glycerate (dihydroxypropionate), zinc glycolate (hydroxyacetate), zinc lactate, zinc pyruvate, zinc gallate, zinc maleate, zinc malonate, zinc succinate, and the like. In some embodiments, the zinc salt may be an inorganic salt, such as zinc chloride, zinc sulfate, zinc nitrate, zinc nitrite, zinc sulfite, and the like, and/or hydrates of these. In some embodiments, the zinc salt is zinc nitrate. In some embodiments, the zinc nitrate is used as zinc nitrate hexahydrate ($Zn(NO_3)_2 \cdot 6H_2O$). In some embodiments, the concentration of the zinc salt in the zinc precursor solution is in the range of 0.1 to 1.5 M, preferably to 0.15 to 1.25 M, preferably 0.20 to 1.00 M, preferably 0.25 to 0.75 M, preferably 0.30 to 0.70 M, preferably 0.35 to 0.60 M, preferably 0.40 to 0.55 M, preferably 0.45 to 0.50 M.

In some embodiments, the carboxylate ligand is a type of ligand in coordination chemistry where a carboxylate group ($RCOO^-$) binds to a metal center. In a preferred embodiment, the carboxylate ligand is a polydentate carboxylate ligand. In some embodiments, the polydentate carboxylate ligand includes 2 to 12 carboxylate functional groups, or 3 to 8 carboxylate functional groups, or 4 to 6 carboxylate functional groups. In some embodiments, the polydentate carboxylate ligand includes 3 to 6 carboxylate functional groups.

In general, the carboxylate ligand or an acid form thereof can be any suitable carboxylate ligand. Examples of suitable such carboxylate ligands include, but are not limited to propionic acid, acrylic acid, lactic acid, pyruvic acid, butyric acid, succinic acid, fumaric acid, malic acid, itaconic acid, gluconic acid, and the like. In some embodiments, the carboxylate ligand or an acid form thereof is citric acid. In a preferred embodiment, the zinc carboxylate complex is a zinc citrate complex.

In some embodiments, the precursor mixture has a ratio of zinc to borate of 0.75:1 to 1:0.75, preferably 0.80:1 to 1:0.80, preferably 0.85:1 to 1:0.85, preferably 0.90:1 to 1:0.90, preferably 0.95:1 to 1:0.95, preferably 1:1.

The precursor mixture, once formed, may be stirred for different durations, including 30 minutes, 20 minutes, 15 minutes, or 10 minutes. In some embodiments, the stirring time is 5 minutes. Stirring may be advantageous for ensuring that the mixture remains homogeneous and that the reactants are evenly distributed, essential for consistent and efficient product formation.

At step 54, the method 50 includes adding to the precursor mixture a polyol to form a reaction mixture. In some embodiments, the polyol is at least one selected from the group consisting of a diol, a triol, a tetrol, and a pentol. In some embodiments, the polyol is a diol. In general, the diol can be any suitable type or class of diol, such as a geminal (gem-) diol, a vicinal (vic-) diol, a 1,3-diol, a 1,4-diol, etc. Examples of suitable diols include, but are not limited to ethylene glycol, propylene glycol, 1,3-propanediol, 1,4-butanediol, 1,5-pentanediol, 1,6-hexanediol, 2,2-propanediol, 1,2-butanediol, 1,3-butanediol, 2,3-butanediol, 2,5-hexanediol, 2-methyl-2,4-pentanediol, neopentyl glycol, 2-methyl-2-propyl-1,3-propanediol, and combinations of these. In some embodiments, the polyol is ethylene glycol. The use of a polyol may be advantageous for preventing, slowing, or inhibiting the agglomeration of ZnO nanoparticles during the synthesis. The use of the polyol may be associated with a more stable colloidal dispersion of the ZnO nanoparticles. In some embodiments, the reaction mixture has a ratio of carboxylate ligand to polyol of 0.1:1 to 1:1, preferably 0.25:1 to 0.75:1, preferably 0.30:1 to 0.70:1, preferably 0.35:1 to 0.65:1, preferably 0.40:1 to 0.60:1, preferably 0.45:1 to 0.55:1, preferably 0.5:1.

At step 56, the method 50 includes heating the reaction mixture to 60 to 180° C., preferably 80 to 160° C., preferably 100 to 150° C., preferably 110 to 135° C., preferably 115 to 130° C., preferably 120° C. to form a solid intermediate product.

At step 58, the method 50 includes calcining the solid intermediate product at 500 to 800° C. to form the zinc oxide/borate nanocomposite. In general, the calcination may be performed by any conventional method or apparatus known to a person skilled in the art, for example, but not limited to, using a muffle furnace, electric furnace, tube furnace, box furnace, crucible furnace, microwave furnace, vacuum furnace, rotary kiln, or fluidized bed furnace. In some embodiments, calcination occurs at 500 to 800° C., preferably 525 to 775° C., preferably, 550 to 750° C., preferably 575 to 725° C., preferably 600 to 700° C., preferably 625 to 675° C., preferably 640 to 660° C., preferably about 650° C.

In general, the nanocomposite may be characterized by various analytical techniques known to those in the art. For example, nitrogen adsorption-desorption analysis is a technique for characterizing the nanocomposite's porous structures. It provides information about mean pore diameter, surface area, and total pore volume. The mean pore diameter, measured by nitrogen adsorption-desorption analysis, is a parameter that provides insight into the nanocomposite's porous structure and potential applications. The mean pore diameter is derived from the adsorption isotherm using the Barrett-Joyner-Halenda (BJH) method, which analyzes the desorption branch of the isotherm. This measurement reveals the average size of the pores, which is used for understanding how the nanocomposite interacts with different molecules and how effectively it can facilitate processes like adsorption and catalysis. In some embodiments, the nanocomposite has a mean pore diameter of 3 to 12 nm, preferably 3.25 to 11.75 nm, preferably 3.5 to 11.5 nm, preferably 3.75 to 11.25 nm, preferably 4 to 11 nm, preferably 4.25 to 10.75 nm, preferably 4.5 to 10.5 nm, preferably 4.75 to 10.25 nm, preferably 5 to 10 nm, preferably 5.25 to 9.75 nm, preferably 5.5 to 9.5 nm, preferably 5.75 to 9.25 nm, preferably 6 to 8 nm. In some embodiments, the zinc oxide/borate nanocomposite has a mean pore diameter of 7.86 nm.

The total pore volume, as measured by nitrogen adsorption-desorption analysis, is a metric that quantifies the volume of all the pores within a material. It is typically expressed in cubic centimeters per gram ($cm^3/g$). In some embodiments, the nanocomposite has a pore volume of 0.100 to 0.200 $cm^3/g$, preferably 0.110 to 0.180 $cm^3/g$, preferably 0.120 to 0.170 $cm^3/g$, preferably 0.130 to 0.160 $cm^3/g$, preferably 0.140 to 0.150 $cm^3/g$. In some embodiments, the zinc oxide/borate nanocomposite has a total pore volume of 0.1420 $cm^3/g$.

The surface area, often calculated using the Brunauer-Emmett-Teller (BET), quantifies the total area available for adsorption per unit mass of the nanocomposite. It is typically expressed in square meters per gram ($m^2/g$). In some embodiments, the nanocomposite has a BET surface area of 15 to 60 $m^2/g$, preferably 20 to 55 $m^2/g$, preferably 25 to 50 $m^2/g$, preferably 30 to 45 $m^2/g$, preferably 35 to 40 $m^2/g$. In some embodiments, the zinc oxide/borate nanocomposite has a BET surface area of 36.27 $m^2/g$.

Classifying porous materials into mesoporous and microporous categories is primarily determined by their mean pore diameters, significantly influencing their properties and applications. Microporous materials have pore diameters less than 2 nm, which allows them to effectively trap small molecules and gases. Mesoporous materials have pore diameters ranging from 2 nm to 50 nm, making them well-suited for accommodating larger molecules and facilitating processes requiring greater fluid flow and accessibility. In an embodiment, the nanocomposite is preferably mesoporous since the average pore size exceeds 2 nm but is less than 50 nm, consistent with the criteria for mesopores.

In some embodiments, the nanocomposite includes both zinc oxide (ZnO) and a zinc borate. In some embodiments, the zinc borate has a formula of $Zn_3(BO_3)_2$. In some embodiments, zinc oxide is crystalline by PXRD. In some embodiments, the zinc borate is crystalline by PXRD. In some embodiments, both the ZnO and the zinc borate are crystalline by PXRD. In some embodiments, the zinc oxide is crystalline and adopts a hexagonal crystal structure. In some embodiments, the zinc oxide is crystalline and adopts a cubic crystal structure. In some embodiments, the $Zn_3(BO_3)_2$ is crystalline and adopts a monoclinic crystal structure. In some embodiments, the nanocomposite is substantially free of other crystalline phases by PXRD. Examples of such phases include $B_2O_3$, $B(OH)_3$, $B_6O$, $Zn(NO_3)_2$, and zinc borates other than $Zn_3(BO_3)_2$. In a preferred embodiment, the nanocomposite is free of boron hydroxide by PXRD.

In some embodiments, the nanocomposite is in the form of particles. In some embodiments, the particles form agglomerates. In some embodiments, the nanocomposite includes particles that include both the ZnO and the zinc borate. In some embodiments, the nanocomposite includes particles of ZnO. In some embodiments, the nanocomposite includes particles of the zinc borate. The term "crystallites" can refer to particles that are crystalline by PXRD as described above or the crystalline portion of particles that contain a crystalline portion and a non-crystalline portion. The term "crystallite size" can refer to the size of the crystallites. In some embodiments, the particle size is equal to or approximately equal to the crystallite size. In some embodiments, the particle size is greater than the crystallite size. In such a case, the particle may include non-crystalline material, such a amorphous material, and/or be formed from multiple crystallites.

In general, the particles can be any shape known to one of ordinary skill in the art. Examples of suitable shapes the particles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For particles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the particles are envisioned as having in any embodiments.

In some embodiments, the particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of particles having a different shape. As used herein, the term "non-uniform shape" refers to an average consistent shape that differs by more than 10% of the distribution of particles having a different shape. In one embodiment, the shape is uniform and at least 90% of the particles are spherical or substantially circular, and less than 10% are polygonal. In another embodiment, the shape is non-uniform and less than 90% of the particles are spherical or substantially circular, and greater than 10% are polygonal.

In some embodiments, the particles have a mean particle size of 10 to 150 nm, preferably 15 to 125 nm, preferably 20 to 100 nm, preferably 25 to 75 nm, preferably 30 to 70 nm, preferably 35 to 65 nm, preferably about 40 to 60 nm. In embodiments where the particles are spherical, the particle size may refer to a particle diameter. In embodiments where the particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the particles have an anisotropic shape such as nanorods, the particle size may refer to a length of the nanorod, a width of the nanorod, an average of the length and width of the nanorod. In some embodiments in which the particles have non-spherical shapes, the particle size refers to the diameter of a sphere having an equivalent volume as the particle. In some embodiments in which the particles have non-spherical shapes, the particle size refers to the diameter of a sphere having an equivalent diffusion coefficient as the particle.

In some embodiments, the particles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the particles of the present disclosure are monodisperse having a particle size distribution ranging from 80% of the average particle size to 120% of the average particle size, preferably 90-110%, preferably 95-105% of the average particle size. In some embodiments, the particles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, preferably comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the nanocomposite includes agglomerates of crystallites (crystalline particles). In some embodiments, the agglomerates have a mean particle size of 100 to 750 nm, preferably 125 to 725 nm, preferably 150 to 700 nm, preferably 175 to 675 nm, preferably 200 to 600 nm, preferably 225 to 575 nm, preferably 250 to 550 nm, preferably 275 to 525 nm, preferably 300 to 500 nm. In some embodiments, the agglomerates form a dense structure with clear edges and boundaries.

In general, the agglomerates can have any shape. In some embodiments, the agglomerates exhibit irregular shapes. Examples of morphologies the agglomerates may take include, but are not limited to nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, etc., and mixtures thereof.

EXAMPLES

The following examples demonstrate zinc oxide/borate nanocomposite as described herein. The examples are provided solely for illustration and are not to be construed as limitations of the present disclosure, as many variations are possible without departing from the spirit and scope of the present disclosure.

Example 1: Chemicals

Chemicals used in the present disclosure were purchased from Sigma-Aldrich Chemical Company. Boric acid ($H_3BO_3$), zinc nitrate hexahydrate ($Zn(NO_3)_2 \cdot 6H_2O$), citric acid ($C_6H_8O_7$), and ethylene glycol ($C_2H_6O_2$) were employed as the primary reagents in the synthesis of the $ZnO/Zn_3(BO_3)_2$ nanocomposite.

Figure 1B:
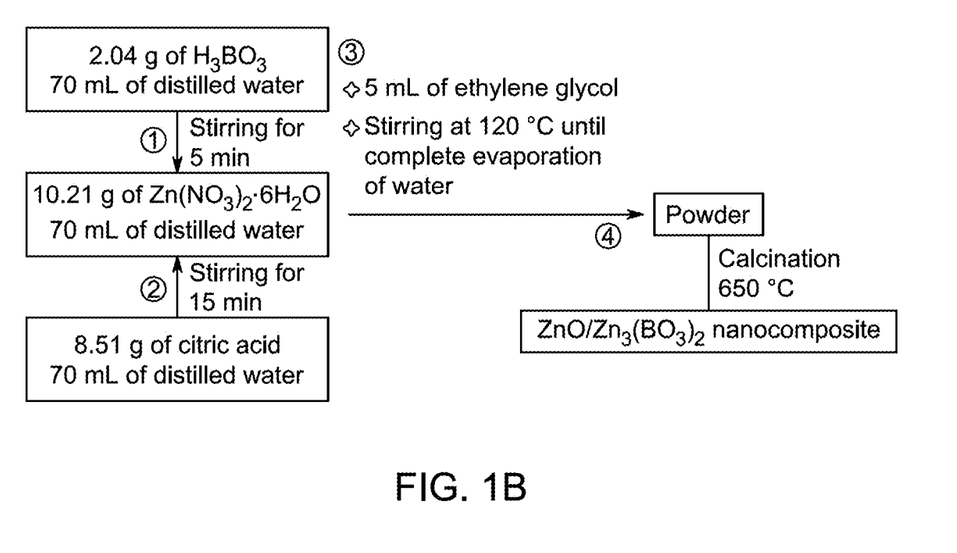
FIG. 1B is an exemplary illustration of experimental steps used to produce the ZnO/$Zn_3(BO_3)_2$ nanocomposite, according to certain embodiments.

Example 2: Synthesis of $ZnO/Zn_3(BO_3)_2$ Nanocomposite Using Pechini Sol-Gel Method The $ZnO/Zn_3(BO_3)_2$ nanocomposite was synthesized using the Pechini sol-gel method, as shown in FIG. 1B, which illustrates the steps for the production of $ZnO/Zn_3(BO_3)_2$ nanocomposite. Firstly, 2.04 g of boric acid ($H_3BO_3$) was dissolved in 70 mL of distilled water. Separately, 10.21 g of zinc nitrate hexahydrate ($Zn(NO_3)_2 \cdot 6H_2O$) was also dissolved in 70 mL of distilled water. The boric acid solution was then added to the zinc nitrate solution with constant stirring for 5 min. Subsequently, 8.51 g of citric acid ($C_6H_8O_7$) was dissolved in 70 mL of distilled water and added to the mixture with continuous stirring for 15 min. Further, 5 mL of ethylene glycol ($C_2H_6O_2$) was introduced into the mixture, and the resulting solution was stirred at 120° C. until complete evaporation of water occurred, thereby forming a dried gel. The obtained gel was then calcined at 650° C. to produce the $ZnO/Zn_3(BO_3)_2$ nanocomposite.

Figure 2:
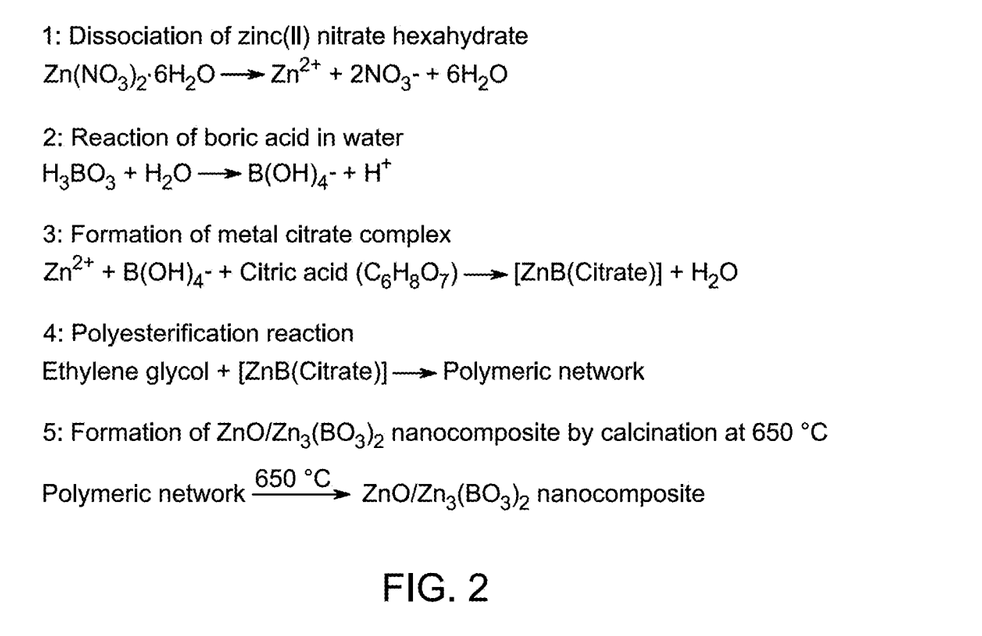
FIG. 2 is a reaction mechanism depicting the synthesis of the ZnO/$Zn_3(BO_3)_2$ nanocomposite by Pechini sol-gel method, according to certain embodiments.

FIG. 2 illustrates the synthesis process of the $ZnO/Zn_3(BO_3)_2$ nanocomposite. Initially, zinc(II) nitrate hexahydrate undergoes dissociation, leading to the release of zinc ions and nitrate ions in solution. Simultaneously, boric acid reacts with water, forming borate ions. These species interact with citric acid to form a metal-citrate complex, which serves as the precursor for the nanocomposite. Through a polyesterification reaction involving ethylene glycol, a polymeric network is formed. The final step involves the calcination of the polymeric network at 650° C., resulting in the formation of the $ZnO/Zn_3(BO_3)_2$ nanocomposite.

Example 3: Characterization

Figure 3:
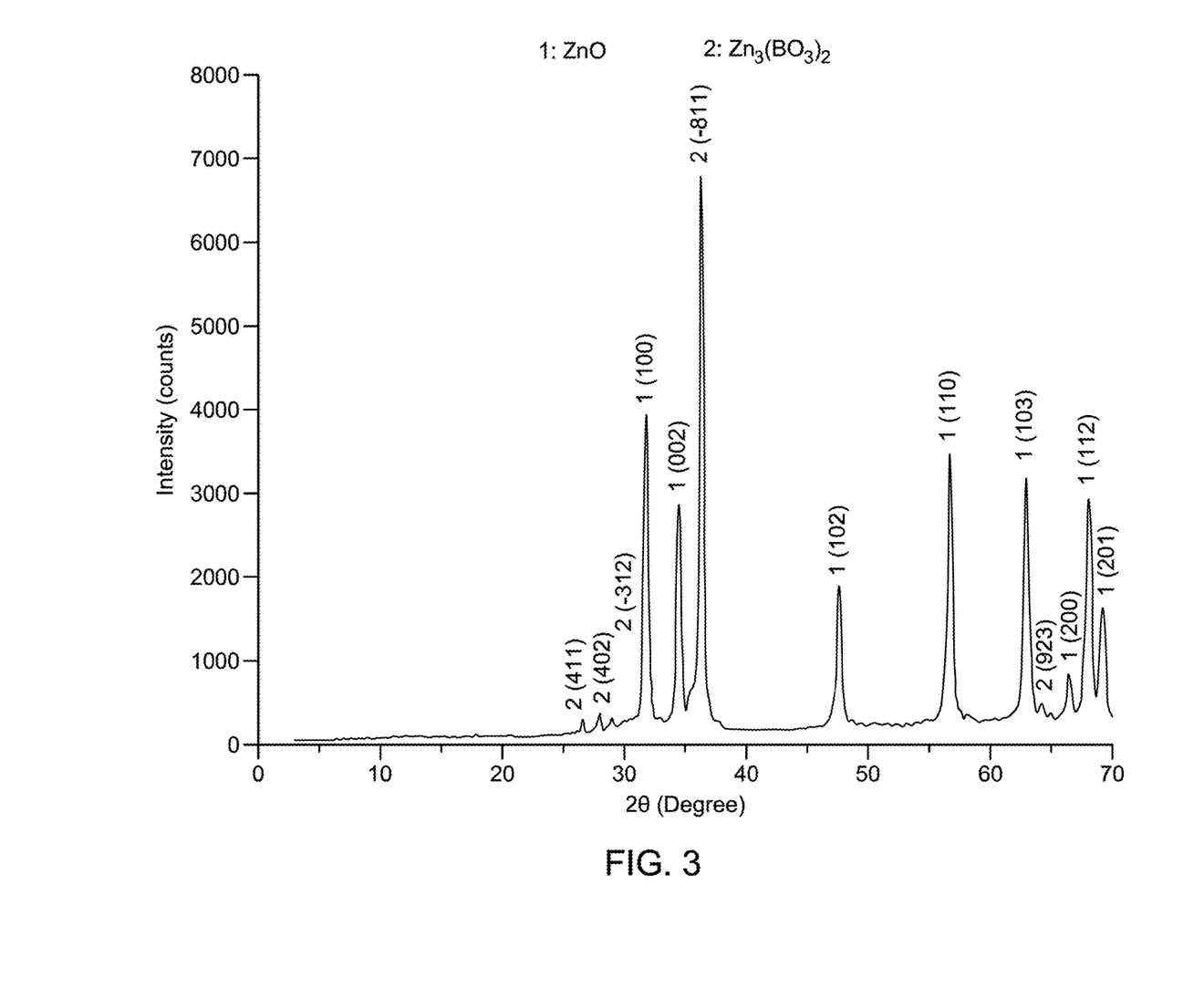
FIG. 3 shows a X-ray diffraction (XRD) graph of the ZnO/$Zn_3(BO_3)_2$ nanocomposite, according to certain embodiments.

X-ray diffraction (XRD) analysis confirmed the successful formation of ZnO and $Zn_3(BO_3)_2$ phases with well-defined crystalline structures. The X-ray diffraction analysis showed that the synthesized nanocomposite consists of zinc oxide (ZnO) in a hexagonal crystal system (JCPDS No. 01-079-5604) and zinc borate ($Zn_3(BO_3)_2$) in a monoclinic crystal system (JCPDS No. 01-071-2063), as shown in FIG. 3. The average crystallite size of the nanocomposite is 50.44 nm. The X-ray diffraction analysis revealed the following angles (2θ) and their corresponding Miller indices for ZnO: 31.680 (100), 34.42° (002), 47.530 (102), 56.560 (110), 62.96° (103), 66.32° (200), 67.890 (112), and 69.150 (201). Additionally, for $Zn_3(BO_3)_2$, the angles and Miller indices are 26.430 (411), 27.91° (402), 28.950 (−312), 36.190 (−811), and 64.11° (923). The comprehensive analysis of the diffraction peaks confirms the successful synthesis of the $ZnO/Zn_3(BO_3)_2$ nanocomposite with well-defined crystalline structures for both phases.

Figure 4:
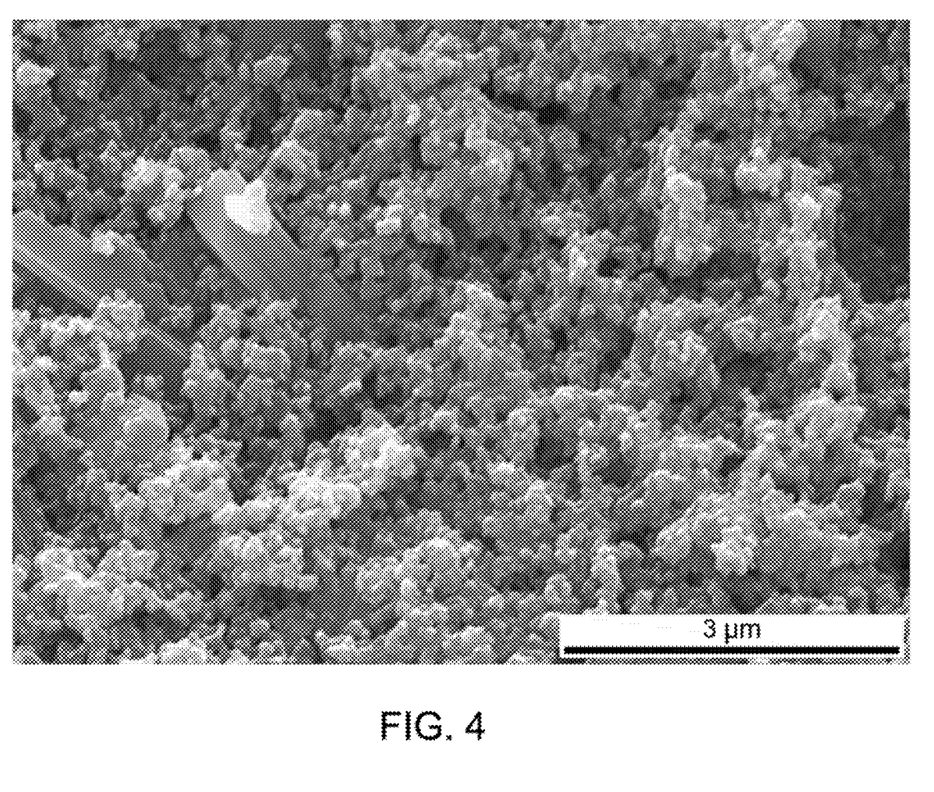
FIG. 4 shows a scanning electron microscope (SEM) image of the ZnO/$Zn_3(BO_3)_2$ nanocomposite, according to certain embodiments.

FIG. 4 shows a scanning electron microscope (SEM) image of the synthesized $ZnO/Zn_3(BO_3)_2$ nanocomposite. The microstructure reveals a uniform distribution of nanostructures with irregularly shaped agglomerated particles and rod-like features. The fine-grained morphology of the nanocomposite indicates successful integration of ZnO and $Zn_3(BO_3)_2$ phases, contributing to a porous structure. The scale bar indicates a size of 3 µm, highlighting the nanoscale nature of the material. This morphology may enhance the surface area and potentially improve the functional properties of the $ZnO/Zn_3(BO_3)_2$ nanocomposite.

Figure 5:
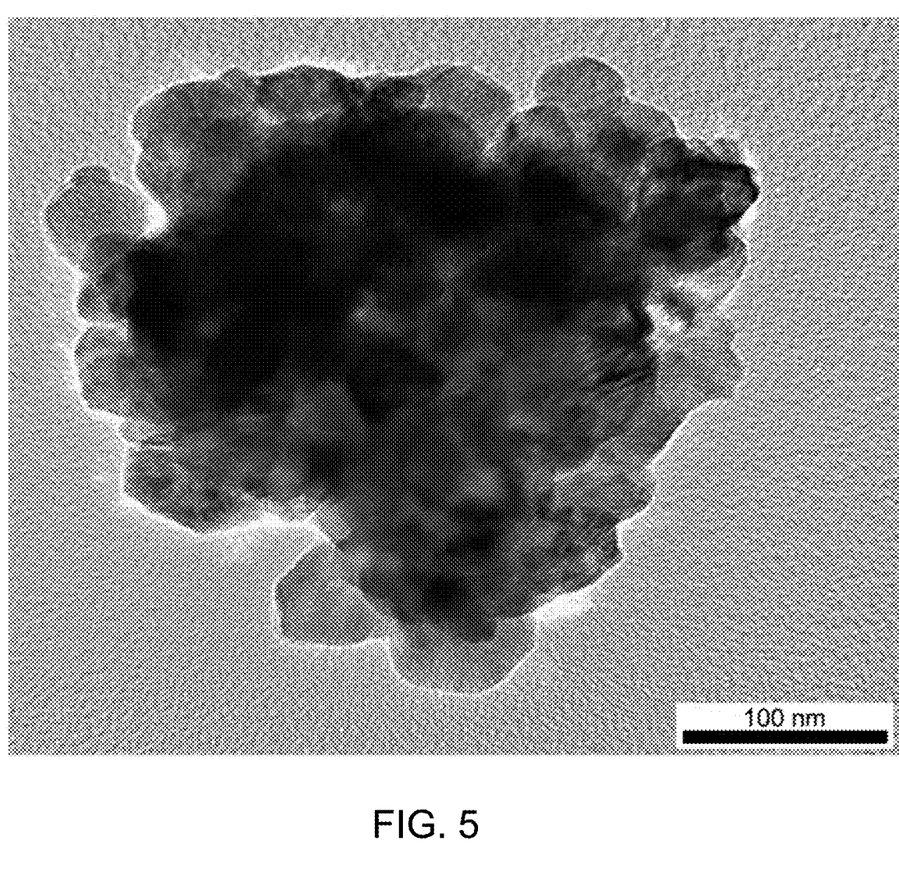
FIG. 5 shows a transmission electron microscope (TEM) image of the ZnO/$Zn_3(BO_3)_2$ nanocomposite, according to certain embodiments.

FIG. 5 shows a transmission electron microscope (TEM) image of the $ZnO/Zn_3(BO_3)_2$ nanocomposite. The image reveals a cluster of nanosized particles with a relatively high degree of agglomeration. The particles exhibit irregular shapes, forming a dense structure with clear edges and boundaries. The size of the individual particles is on the nanometer scale, with the scale bar indicating a length of 100 nm. The high contrast in the image suggests that the nanocomposite contains a well-defined crystalline structure. The observed morphology is consistent with the properties of the $ZnO/Zn_3(BO_3)_2$ nanocomposite, where the combination of ZnO and $Zn_3(BO_3)_2$ phases results in a homogeneous and interconnected network of nanoparticles.

Figure 6:
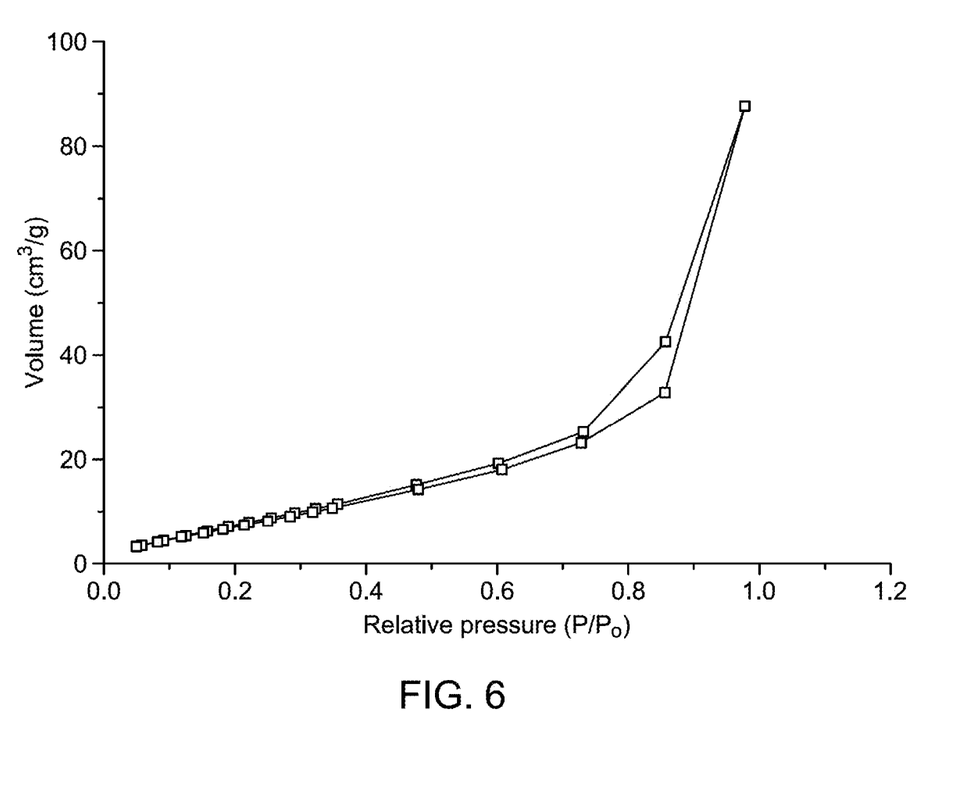
FIG. 6 shows nitrogen ($N_2$) adsorption/desorption isotherm of the ZnO/$Zn_3(BO_3)_2$ nanocomposite, according to certain embodiments.

FIG. 6 displays the nitrogen ($N_2$) adsorption-desorption isotherm of the $ZnO/Zn_3(BO_3)_2$ nanocomposite, which shows a typical type IV isotherm pattern. This behavior is characteristic of mesoporous materials with well-defined capillary condensation, indicating the presence of mesopores. Table 1 summarizes the surface properties of the nanocomposite. The Brunauer-Emmett-Teller (BET) surface area is 36.27 $m^2/g$, the total pore volume is 0.1420 $cm^3/g$, and the mean pore diameter is 7.86 nm. The nanocomposite is confirmed to be mesoporous since the average pore size exceeds 2 nm, consistent with the criteria for mesopores. The data collectively highlight that the $ZnO/Zn_3(BO_3)_2$ nanocomposite possesses a porous structure, primarily mesoporous, which is beneficial for applications requiring materials with high surface areas and well-defined pore structures.

TABLE 1

Surface textures of $ZnO/Zn_3(BO_3)_2$ nanocomposite.

| BET surface area ($m^2/g$) | Total pore volume ($cm^3/g$) | Mean pore diameter (nm) |
|---|---|---|
| 36.27 | 0.1420 | 7.86 |

Example 4: Commercial Applications

The nanocomposite demonstrating significant improvements over existing materials in structural integrity and functional performance. The experimental data show that the composite is reproducible with consistent quality across multiple batches, underscoring its commercial viability. The present disclosure represents a significant advancement in nanocomposites, offering a commercially scalable solution with diverse applications in high-demand industries.

In the present disclosure, the method 50 of fabrication of the $ZnO/Zn_3(BO_3)_2$ nanocomposite using the modified Pechini sol-gel method is described. The composite material is characterized by its unique combination of zinc oxide (ZnO) and zinc borate ($Zn_3(BO_3)_2$) phases, which have been experimentally shown to provide enhanced surface area, mesoporosity, and phase stability. The composite integrates zinc borate with zinc oxide, leading to superior functional properties for advanced applications. The present disclosure is centered around the unique material composition and its enhanced characteristics, making it a significant advancement in nanomaterials.

Numerous modifications and variations of the present disclosure are possible in light of the above teachings. Therefore, it is to be understood that within the scope of the appended claims, the invention may be practiced other than as specifically described herein.

The invention claimed is:

1. A method of forming a zinc oxide/borate nanocomposite, the method comprising
   mixing
      a borate solution comprising boric acid in a polar solvent and
      a zinc solution comprising a zinc carboxylate complex comprising a zinc ion and a coordinated carboxylate ligand to form a precursor mixture;
   adding to the precursor mixture a polyol to form a reaction mixture;
   heating the reaction mixture to 100 to 150° C. to form a solid intermediate product; and
   calcining the solid intermediate product at 500 to 800° C. to form the zinc oxide/borate nanocomposite, wherein
   the zinc oxide/borate nanocomposite comprises $Zn_3(BO_3)_2$ and ZnO,
   the zinc oxide/borate nanocomposite has a BET surface area of 15 to 60 $m^2/g$, a pore volume of 0.100 to 0.200 $cm^3/g$, and a mean pore diameter of 5 to 10 nm;
   the zinc oxide/borate nanocomposite has a mean crystallite size of 10 to 150 nm by PXRD; and
   the zinc oxide/borate nanocomposite comprises agglomerates of crystallites, the agglomerates having a mean particle size of 100 to 750 nm.

2. The method of claim 1, wherein
   the borate solution has a concentration of boric acid of 0.25 to 0.75 M.

3. The method of claim 1, wherein
   the precursor mixture has a ratio of zinc to borate of 0.75:1 to 1:0.75.

4. The method of claim 1, wherein
   the reaction mixture has a ratio of carboxylate ligand to polyol of 0.1:1 to 1:1.

5. The method of claim 1, wherein
   the coordinate carboxylate ligand is a polydentate carboxylate ligand.

6. The method of claim 5, wherein
   the polydentate carboxylate ligand includes 3 to 6 carboxylate functional groups.

7. The method of claim 1, wherein
   the zinc carboxylate complex is a zinc citrate complex.

8. The method of claim 1, wherein
   the polar solvent is at least one selected from the group consisting of tetrahydrofuran, ethyl acetate, acetone, dimethylformamide, acetonitrile, dimethyl sulfoxide, formic acid, acetic acid, methanol, ethanol, n-propanol, isopropanol, nitromethane, and water.

9. The method of claim 1, wherein
   the polar solvent is water.

10. The method of claim 1, wherein
    the polyol is at least one selected from the group consisting of a diol, a triol, a tetrol, and a pentol.

11. The method of claim 10, wherein
    the polyol is a diol.

12. The method of claim 1, wherein the polyol is ethylene glycol.

13. The method of claim 1, further comprising forming the zinc carboxylate complex by mixing
- a zinc precursor solution comprising a zinc salt and water and
- a carboxylate solution comprising the carboxylate ligand or an acid form thereof.

14. The method of claim 13, wherein the zinc salt is zinc nitrate.

15. The method of claim 13, wherein the carboxylate ligand or an acid form thereof is citric acid.

16. The method of claim 1, wherein the zinc oxide/borate nanocomposite is substantially free of boron hydroxide by PXRD.

17. A nanocomposite, comprising
$Zn_3(BO_3)_2$; and
ZnO, wherein
the nanocomposite has a BET surface area of 15 to 60 $m^2/g$, a pore volume of 0.100 to 0.200 $cm^3/g$, and a mean pore diameter of 5 to 10 nm
the nanocomposite has a mean crystallite size of 10 to 150 nm by PXRD; and
the nanocomposite comprises agglomerates of crystallites, the agglomerates having a mean particle size of 100 to 750 nm.

18. The nanocomposite of claim 17, wherein the $Zn_3(BO_3)_2$ is crystalline monoclinic $Zn_3(BO_3)_2$ by PXRD.

19. The nanocomposite of claim 17, wherein the ZnO is crystalline hexagonal ZnO by PXRD.

20. The nanocomposite of claim 17, wherein the nanocomposite is substantially free of boron hydroxide by PXRD.

\* \* \* \* \*